Patented Jan. 10, 1950

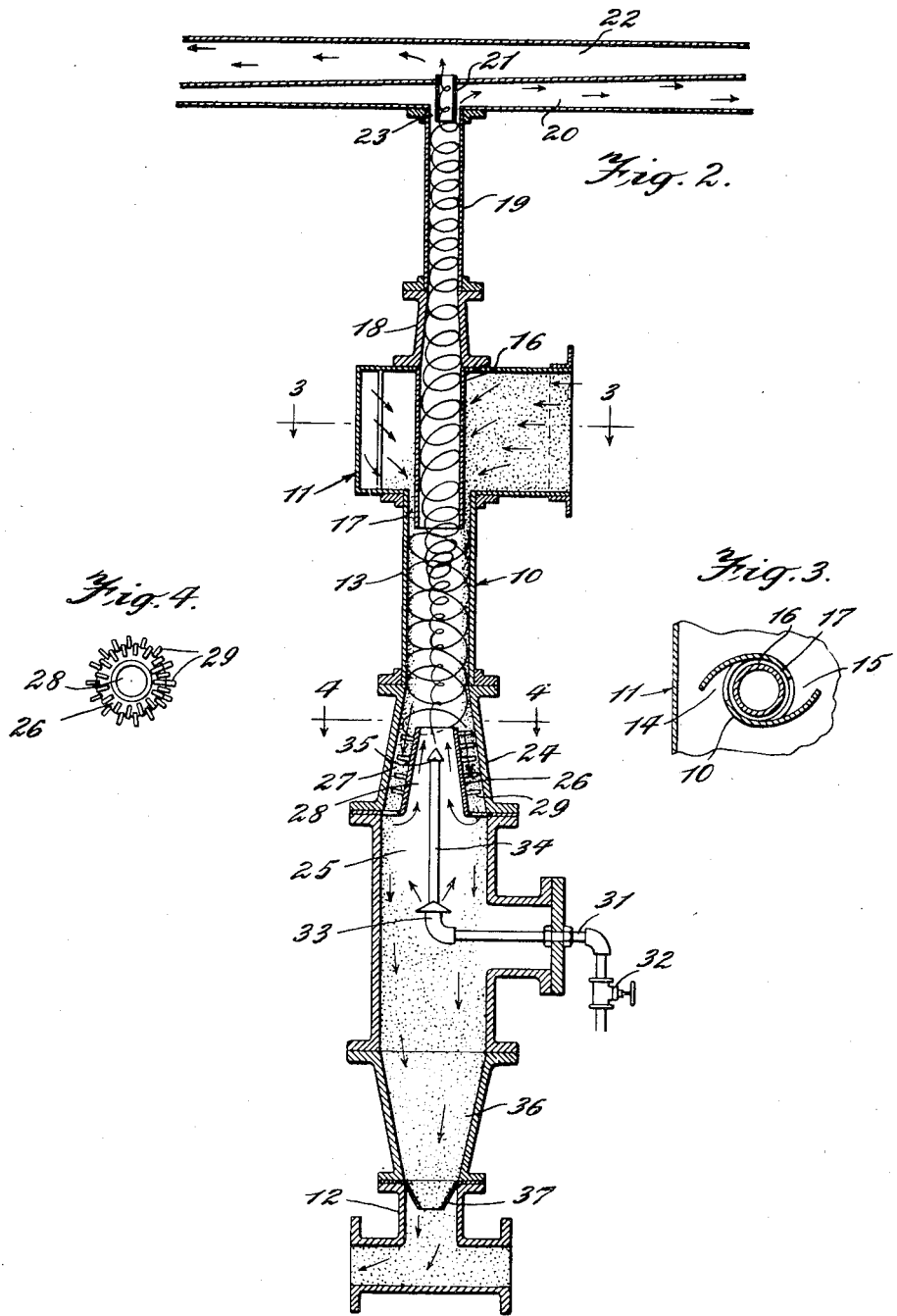

2,494,465

UNITED STATES PATENT OFFICE 2,494,465

APPARATUS FOR CLASSIFYING PARTICLES

John E. Watson, Westport, Conn., and Charles B. McBride, Port Chester, N. Y., assignors to The Aerotec Corporation, Greenwich, Conn., a corporation of Connecticut Application May 23, 1945, Serial No. 595,392

8 Claims. (Cl. 209—144)

Our present invention relates to apparatus and a method for classifying particles and more particularly to separating the finer particles from the coarser particles suspended in a current of air or other gas.

In certain industrial operations as, for example, in grinding or dividing a solid to a very fine mesh it is desirable to separate those particles that have been sufficiently ground, or which are below the mesh required, and to return particles above this size or above the mesh to a further subdivision or grinding. When the mesh to which the particles must be reduced is relatively coarse such a separation may be may quite effectively by a number of means. However, when the grinding or division has to be carried to a very small mesh or a small size, for example to a fineness much less than 200 mesh or to a mesh of 400, the separation of all particles below this mesh from those above, so that the latter may be re-cycled, is much more difficult.

Our present invention provides a method and an apparatus whereby effective separation of very fine particles from coarser particles in suspension in a stream of air or gas may be effectively accomplished.

In our present invention a stream of air or gas carrying particles of various sizes is actuated in a downward helical path and subjected to a centrifugal separation whereby the coarser particles are thrown out of the gas stream centrifugally and the air and finer particles are then withdrawn in an inner upward helical path and separation thus accomplished. The coarser particles thus separated from the gas stream may, however, carry with them a considerable quantity of finer particles, and in our method and apparatus these finer particles are elutriated from the coarser particles by passing a gas coaxially upwardly through the mass of separated coarser particles and returned to the air stream.

The air stream from which the coarser particles have thus been removed and which contains only particles below the mesh desired may be subjected to a secondary rotary and centrifugal action whereby the finer particles are concentrated in an outer rotating annular layer and clear air freed from these finer particles as a central column. The outer rotary air with its suspended particles may be removed or skimmed from the clear air and the suspended particles removed and recovered.

The various features of our invention are illustrated by way of example in the accompanying drawings in which—

Fig. 2 is a vertical section on a plane at right angles to the view of Fig. 1 and on line 2—2 of Fig. 1 taken through one of the centrifugal separators and elutriating apparatus;

Fig. 3 is a horizontal section taken on line 3—3 of Fig. 2;

Fig. 4 is a horizontal section taken on line 4—4 of Fig. 2.

Figure 1:
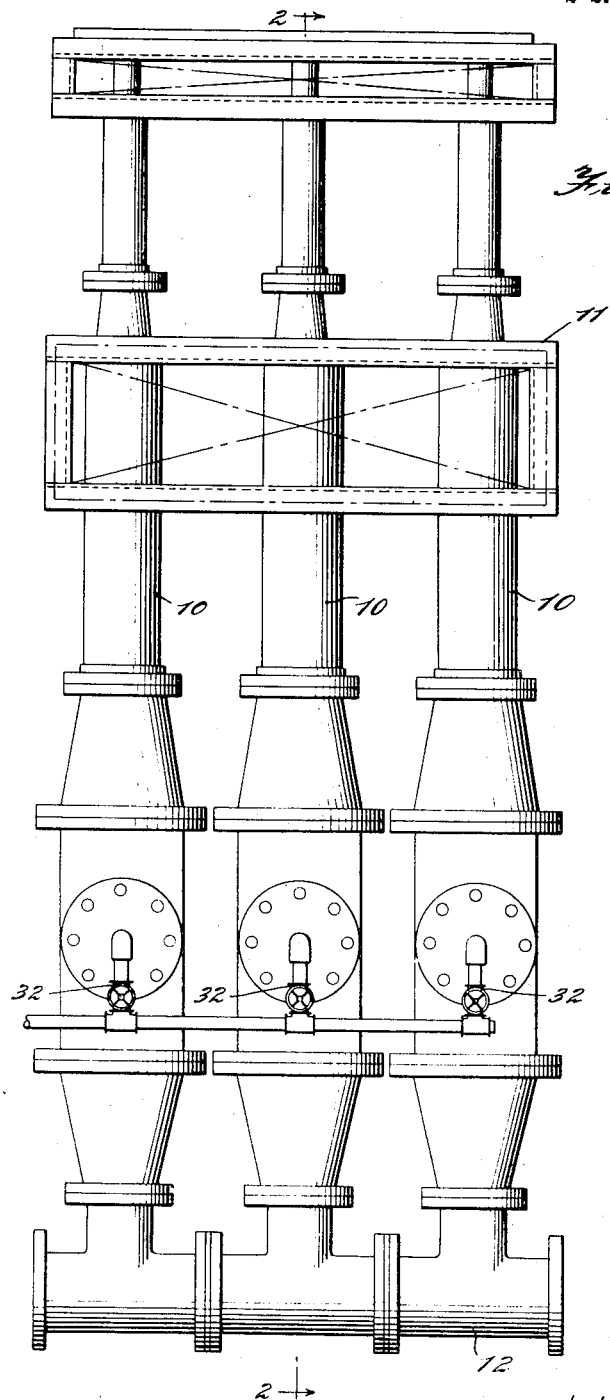
Fig. 1 is a vertical front elevation of apparatus embodying a preferred form of the invention.

In the embodiment of the invention illustrated in the accompanying drawings a number of centrifugal tubes 10, three being shown by way of example, are mounted in parallel to extend through a feed or plenum chamber 11. These centrifugal separator tubes deliver into a common off-take manifold 12.

As shown in Figs. 2 and 3 each centrifugal tube comprises a cylindrical extension 13 extending downwardly from the lower wall of the plenum chamber 11, a part within the plenum chamber having means to admit gases tangentially as, for example, tangential openings 14 and 15. Also within the plenum chamber 11 and within the tube 10 is a primary open ended off-take pipe 16 which extends downwardly below the bottom of the plenum chamber 11 into the cylindrical extension 13. The off-take pipe 16 forms an annular space 17 into which the tangential inlets 14 and 15 deliver and this passage extends downwardly to the lower end of the pipe 16.

The air or gases entering the tangential inlets 14 and 15 are given a rotary motion and pass tangentially downwardly through the passage 17 for a substantial distance below the lower end of the off-take pipe 16. In this rapid helical movement the coarser particles are thrown outwardly to the inner surface of the extension 13 and gradually travel to the lower part thereof. The rotating gases, however, pass upwardly while continuing their rotation and thus enter the off-take pipe 16 with a rotary motion which may be increased considerably owing to the smaller diameter of the pipe 16.

The pipe 16 may be provided with a tapering connecting pipe 18 and an extension 19 leading upwardly into an intermediate off-take chamber 20 for air carrying the finer particles. In passing upwardly through the pipe 16 and extensions 18 and 19 the angular speed of the gases may be increased whereby the finer particles are thrown outwardly and collect in a zone next the inner surface of the pipe, while the air or gas within this zone is substantially freed from suspended particles. The outer zone with its dust laden gas is skimmed or withdrawn from the inner dust-free core by means of a secondary off-take pipe 21 of smaller diameter than the extension 19 and extending from within the upper end of the extension 19 and axially thereto into a final off-take chamber 22. The dust laden outer layer passes through an annular opening 23 about the secondary off-take pipe 21 into the dust carrying conduit 20. In this way the particles supplied through the plenum chamber are separated into a quantity of coarser particles against the inner surface of the tubular extension 13 and into a quantity of finer particles carried by the air passing through the annular opening or passage 23.

By suitable selection of the dimensions of the various elements and speed of the gases the separation may be made to take place at a substantially constant selected dividing line.

As the coarser particles are thrown centrifugally onto the inner surface of the tube 13 they may entrain finer particles with them. These particles are separated and returned to the air stream by an elutriating chamber below the centrifugal tube 10. For this purpose a downwardly expanding extension 24 is mounted on the lower end of the tube 10 leading into a separating or air washing elutriating chamber 25.

In the expanding extension 24 is mounted a truncated hollow cone or frusto-conical collar 26 so as to provide a downwardly expanding annular passage 27 within the extension 24 and a central upward passage 28 therethrough. The exterior surface of the collar 26 is provided with spikes or pins 29 extending downwardly from the collar into the passage 27 to break up the particles, and air discharged downwardly therethrough. Preferably the pins or spikes are arranged in a spiral series inclined in the opposite direction from the direction of the downwardly passing gases and particles. These pins or spikes have the effect of again suspending the particles in the downwardly passing air (it being understood that this air is very small in quantity as compared with the total supply). As a result of the remixing of these particles with the air a suspension is formed in chamber 25 below the extension 24 in which the larger particles separate easily by gravity, whereas the more finely divided particles tend to float in the air.

The floating of the finer particles is aided by a jet of air supplied through an air supply means comprising a pipe 31 and a control valve 32 to a jet 33 in the chamber 25 and also through an extension 34 to a jet 35 in the passage 28. The effect of these jets is to elutriate the finer particles from the coarser and float them into the passage 28 from which they pass upwardly into the off-take pipe 16.

The coarser particles falling through the chamber 25 pass into a hopper 36 the lower end 37 of which leads into the manifold 12. A small amount of air may also enter the manifold 12 to enable the particles to be withdrawn therethrough. The contraction of the lower end 37 tends to minimize the effect of pressure differences in the hoppers connected to a single manifold.

From the manifold 12 the separated particles may be sent to a mill for grinding or may be sent to other uses or processes.

In the above method and apparatus the suspended particles are not separated only from the air or gas which is delivered to the conduit 22, but the finer particles are separated from the coarser ones and carried with a small amount of the air or gas into the duct 20. From the duct 20 they may be used directly as a suspension or further separated from air or gas to form a powder of the desired maximum mesh.

What we claim is:

1. Apparatus for classifying and separating particles suspended in gases which comprises a centrifugal tube, an open-ended outlet pipe extending downwardly into said tube to form an annular space therein, said tube having means for admitting gases tangentially to said annual space, an expanding extension at the lower end of said tube, a truncated hollow cone in said extension and spaced from the walls thereof to form an annular downwardly expanding passage, an upwardly directed gas injection pipe in said cone, a receiver below said cone for separated suspended particles.

2. The apparatus of claim 1 having pins projecting at spaced intervals into said annular downwardly expanding passage.

3. The apparatus of claim 1 having pins mounted on the outer surface of said cone to project into said annular downwardly expanding passage, said pins being arranged in spiral series inclined transversely to the direction of movement of gases in said tube.

4. Apparatus for classifying and separating particles suspended in gases which comprises a centrifugal tube, an open-ended outlet pipe extending downwardly into said tube to form an annular space therein, said tube having means for admitting gases tangentially to said annular space, a plenum chamber enclosing said tube at said means, an expanding extension at the lower end of said tube, a truncated hollow cone in said extension to form an annular downwardly expanding passage, a receiver below said passage to receive separated particles and an upwardly directed gas injection pipe in said cone.

5. Apparatus for classifying and separating particles suspended in gases which comprises a centrifugal tube, an open-ended outlet pipe projecting downwardly into the upper end of said tube to form an annular space, said tube having means for admitting gases tangentially to said annular space, a plenum chamber enclosing said tube about said means, an expanding extension at the lower end of said tube, a truncated hollow cone in said extension to form an annular downwardly expanding passage, a gas injection pipe in said cone, means below said expanding extension to receive and convey particles separated in said tube.

6. Apparatus for classifying and separating particles suspended in gases which comprises a centrifugal tube having a closed upper end, a primary off-take pipe projecting through said closed upper end and into said tube to form an annular space at the upper end of said tube, said tube having means for admitting gases tangentially to said annular space, an intermediate off-take chamber into which said off-take pipe opens, a final off-take chamber above said intermediate chamber, and a secondary off-take pipe co-axial with said primary off-take pipe and extending therein to form an annular opening to said intermediate off-take chamber and extending upwardly into said final off-take chamber and air supply, means at the lower end of said tube to buoy the lighter particles upwardly from the separated larger or heavier particles to said primary off-take pipe.

7. Apparatus for classifying and separating particles suspended in gases which comprises a centrifugal tube closed at its upper end, an off-take chamber above said tube, an open-ended off-take pipe extending into said tube to form an annular space, said tube having means for admitting gases tangentially to said annular space, said off-take pipe extending through said off-take chamber and having an annular opening into said off-take chamber, an expanding extension at the lower end of said tube, a truncated hollow cone in said extension to form an annular downwardly extending passage, means to supply air jets below said cone to suspend lighter particles passed through said downwardly expanding annular passage and direct them upwardly through said cone and toward the lower end of said off-take pipe.

8. A centrifugal apparatus comprising a centrifugal tube, an off-take pipe extending axially thereinto and spaced from the inner surface of said tube to form an annular space, means for supplying dust-laden gases with a rotational movement to said annular space, an expanding extension at the lower end of said tube below the off-take pipe, a hollow truncated cone positioned centrally in and spaced from the wall of said extension to form an annular passage, a chamber below said extension and means in said chamber and in said cone to supply jets of gas to create an upward draft through said chamber and said cone.

JOHN E. WATSON.
CHARLES B. McBRIDE.

REFERENCES CITED

The following references are of record in the file of this patent:

UNITED STATES PATENTS

| Number | Name | Date |
|---|---|---|
| 15,879 | Cormack et al. | Oct. 14, 1856 |
| 739,231 | Snee | Sept. 15, 1903 |
| 1,719,119 | McKain | July 2, 1929 |
| 1,756,960 | Stebbins | May 6, 1930 |
| 1,908,181 | Prouty | May 9, 1933 |
| 2,102,525 | Freeman | Dec. 14, 1937 |
| 2,252,581 | Saint-Jacques | Aug. 12, 1941 |
| 2,354,311 | Harlow | July 25, 1944 |
| 2,360,355 | McBride et al. | Oct. 17, 1944 |
| 2,381,954 | Hardinge | Aug. 14, 1945 |
| 2,389,701 | Truesdale | Nov. 27, 1945 |

FOREIGN PATENTS

| Number | Country | Date |
|---|---|---|
| 117,190 | Austria | Apr. 10, 1930 |
| 676,456 | Germany | June 3, 1939 |